(12) United States Patent
Harpin et al.

(10) Patent No.: US 6,212,323 B1
(45) Date of Patent: Apr. 3, 2001

(54) TEMPERATURE STABLE INTEGRATED OPTICAL DEVICE

(75) Inventors: Arnold Peter Roscoe Harpin, Oxford; Andrew George Rickman, Marlborough, both of (GB)

(73) Assignee: Bookham Technology PLC, Oxfordshire (GB)

( * ) Notice: Subject to any disclaimer, the term of this patent is extended or adjusted under 35 U.S.C. 154(b) by 0 days.

(21) Appl. No.: 09/121,031

(22) Filed: Jul. 23, 1998

(30) Foreign Application Priority Data

Jun. 19, 1998 (GB) .................................... 9813281

(51) Int. Cl.⁷ .................................... G02B 6/10
(52) U.S. Cl. .................... 385/129; 385/130; 385/39; 385/14
(58) Field of Search .................... 385/14, 15, 39, 385/48, 50, 129, 130, 141, 142

(56) References Cited

U.S. PATENT DOCUMENTS

| | | | |
|---|---|---|---|
| 4,923,278 | * 5/1990 | Kashyap et al. | |
| 5,311,279 | 5/1994 | Wendler | 356/345 |
| 5,611,007 | 3/1997 | Wolf et al. | 385/14 |
| 5,703,978 | * 12/1997 | DiGiovanni et al. | 385/37 |
| 5,799,118 | 8/1998 | Ogusu et al. | 385/14 |

FOREIGN PATENT DOCUMENTS 0 281 385 A2   9/1988   (EP) .................... G01B/9/02

OTHER PUBLICATIONS

International Search Report for International Application No. PCT/GB99/01946 (2 pages).

H. Tanobe et al. "Temperature Insensitive Arrayed Waveguide Gratings on InP Substrates", IEEE Photonics Technology Letters, vol. 10, No. 2, Feb. 1, 1998, pp. 235–237.

* cited by examiner

*Primary Examiner*—Rodney Bovernick
*Assistant Examiner*—Sarah U Song
(74) *Attorney, Agent, or Firm*—Fleshner & Kim, LLP

(57) ABSTRACT

The present invention is a temperature stable integrated optical device which is substantially insensitive to temperature variations. The device, such as an interferometer, includes sub-sections of a different light transmissive material within the optical pathways. The relative lengths of the two different material waveguides can be selected so as to achieve temperature insensitivity. A suitable balance is to ensure that the ratio of the difference in sub-path lengths of the first and second materials is equal to the ratio of the refractive index gradient with temperature of the second material to the refractive index gradient with temperature of the first material. Preferable materials are silicon and silicon nitride.

12 Claims, 2 Drawing Sheets

TEMPERATURE STABLE INTEGRATED OPTICAL DEVICE

TECHNICAL FIELD

This invention relates to temperature stable integrated optical devices such as integrated silicon waveguides for use in optical circuits and the modulation of light within those circuits.

BACKGROUND ART

Interferometers are important elements of optical circuits, and are used, for example, to provide a wavelength selection function, routing functions, analysis functions, interrogation functions, switching etc. Such devices work by providing two pathways for the incoming light which are of slightly different optical length. The two pathways then recombine, at which point interference effects occur and wavelength selection, for example, is achieved.

A major difficulty with fabricating such interferometers is that silicon has a refractive index that varies with temperature, as do most optical materials. Thus, devices using imbalanced optical paths with a nominally fixed length will have a transmission characteristic which will vary with temperature.

This temperature variation is commonly alleviated either by using thermo-electric coolers or by heating the entire optical component to a specified temperature. Thermo-electric coolers are expensive, whilst it is often undesirable to heat the component.

DISCLOSURE OF INVENTION

According to the present invention, there is provided an integrated optical device comprising first and second associated optical pathways, at least the first pathway including at least two sub-sections of first and second different transmissive materials, the different materials exhibiting a different temperature dependence of refractive index, the lengths of the pathways and of sub-sections being selected such that the device is substantially temperature insensitive.

Preferably, through the use of two different materials, the invention allows the difference in thermal dependence between the two materials in the first pathway to be exploited so as to match the composite thermal dependence of the first pathway to the second.

Alternatively, it is possible for the second pathway to be of a single material, but it is usually easier to design the device if the second pathway also includes a sub-section of a different transmissive material.

Suitable materials are silicon and silicon nitride, although the present invention is not limited to that combination of materials. Likewise, simplicity of design can be achieved by including only two sub-pathways in the relevant pathway.

The preferred embodiment is likely to include two sub-sections on two pathways, and therefore the remainder of this Application will include description of such a device. However, the principle of temperature compensation disclosed herein can be employed if desired in more complex arrangements.

A preferred method of selecting the lengths of pathways and sub-pathways to achieve temperature insensitivity is to ensure that the ratio of the difference in length of sub-sections formed of the first material to the difference in length of sub-sections formed of the second material is equal to the ratio of the refractive index gradient with temperature of the second material to the refractive index gradient with temperature of the first material. This can also be expressed as in equation 7 below.

The device is preferably an interferometer. However, the invention is applicable to any device using two or more nominally fixed length pathways, such as an arrayed waveguide grating.

Other preferred features of the invention will be apparent from the following description and the subsidiary claims of the specification.

BRIEF DESCRIPTION OF DRAWINGS

Embodiments of the present invention will now described, by way of example, with reference to the accompanying Figures, in which.

BEST MODE OF CARRYING OUT THE INVENTION

It should be noted that for convenience of description, terms such as "lateral", "vertical", "side", "top" etc. used in the specification refer to directions relative to a device in the orientation shown in the accompanying drawings. The terms should not, however, be interpreted as restricting the scope of the claimed invention which may in practice be used in any orientation.

Figure 1:
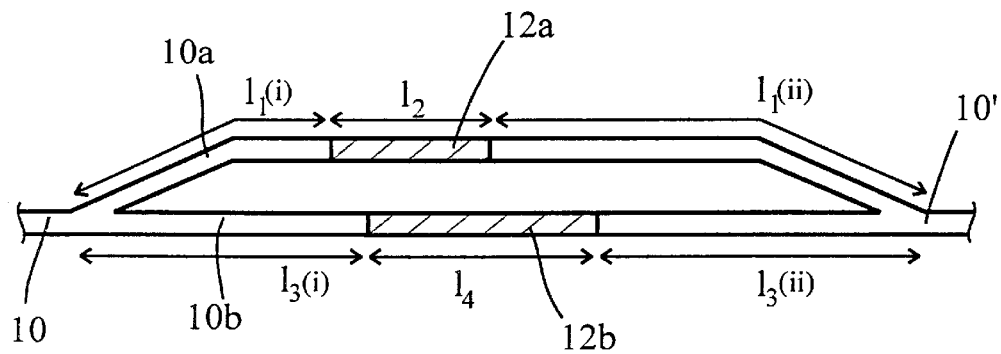
FIG. 1 is a top view of an interferometer illustrating the present invention.

FIG. 1 shows schematically a path imbalanced interferometer constructed according to the present invention. An optical pathway 10 divides into sub-pathways 10a and 10b before finally recombining as 10'. Sub-pathways 10a and 10b are of different physical lengths and are intended to provide a different optical path length to light which eventually recombines at 10' to interfere and provide wavelength selection. Such structures can be constructed as set out in (for example) our earlier application WO95/08787 corresponding to U.S. Pat. No. 5,757,986, whose disclosure is incorporated herein by reference.

In the preferred embodiment illustrated, the optical pathway 10, 10a, 10b, 10' is generally formed of silicon. However, sub-pathway 10a includes a short section 12a of silicon nitride, and (likewise) sub-pathway 10b includes a sub-section 12b of silicon nitride. Silicon nitride has a different refractive index and a different temperature co-efficient of refractive index as compared to silicon.

As noted in FIG. 1, the total length of silicon waveguide in sub-pathway 10a is equal to the sum of the lengths $l_1(i)$ and $l_1(ii)$, whilst the length of silicon nitride waveguide 12a is equal to $l_2$.

Within sub-pathway 10b, the total length of silicon waveguide is equal to the sum of the lengths $l_3(i)$ and $l_3(ii)$, and the length of silicon nitride waveguide 12b is equal to $l_4$. For simplicity, the aggregate values $l_1$ and $l_3$ will be used to denote the total length of silicon waveguide in sub-pathways 10a and 10b respectively.

In this case, the total effective path difference will be;

$$OPD = n_1 l_1 + n_2 l_2 - n_1 l_3 - n_2 l_4 \quad [1]$$

where $n_1$ and $n_2$ are the refractive indices of silicon and silicon nitride respectively. If we assume that $$\frac{dl_x}{dT} = 0 \quad \{\text{for } x = 1 \text{ to } 4\}, \quad [2]$$

which is reasonable for the materials considered, this gives $$\frac{dOPD}{dT} = l_1\frac{dn_1}{dT} + l_2\frac{dn_2}{dT} - l_3\frac{dn_1}{dT} - l_4\frac{dn_2}{dT} \quad [3]$$

where $$\frac{dn_1}{dT} \quad \text{and} \quad \frac{dn_2}{dT}$$

are the temperature dependencies of the refractive indices of silicon and silicon nitride respectively.

If we set $$\frac{dOPD}{dT} = 0,$$

i.e. requiring no change of refractive index with temperature, and rearranging, we have;

$$0 = (l_1 - l_3)\frac{dn_1}{dT} + (l_2 - l_4)\frac{dn_2}{dT} \quad [4]$$

This can be rewritten as $$(l_1 - l_3)\frac{dn_1}{dT} = (l_4 - l_2)\frac{dn_2}{dT} \quad [5]$$

In general, the temperature dependence of refractive index with temperature is substantially linear, allowing us to introduce an arbitrary coefficient r, being the ratio of the temperature coefficients for the two materials. Thus, $$\frac{dn_1}{dT} = r\frac{dn_2}{dT} \quad [6]$$

giving $$r(l_1 - l_3) = (l_4 - l_2) \quad [7]$$

This could of course be rewritten as $$r = \frac{(l_4 - l_2)}{(l_1 - l_3)} \quad [8]$$

Thus, for an optical device satisfying this result, variations in refractive index in the different transmissive materials will cancel each other out with the result that the total optical path difference of the device will remain constant with temperature. Thus, the invention provides a temperature stable device.

It is clear that satisfying these equations places some constraints on the possible lengths $l_1$, $l_2$, $l_3$ and $l_4$, but in practice there remain enough degrees of freedom to obtain a workable design.

In practice, the optical effect called for will set the optical path difference, and one of the path lengths will be set by the physical arrangement of the device. The ratio r is a constant, meaning that equations 1 and 7 must be solved for a fixed $l_1+l_2$. Thus, there are sufficient variables to satisfy the necessary conditions.

Figure 2:
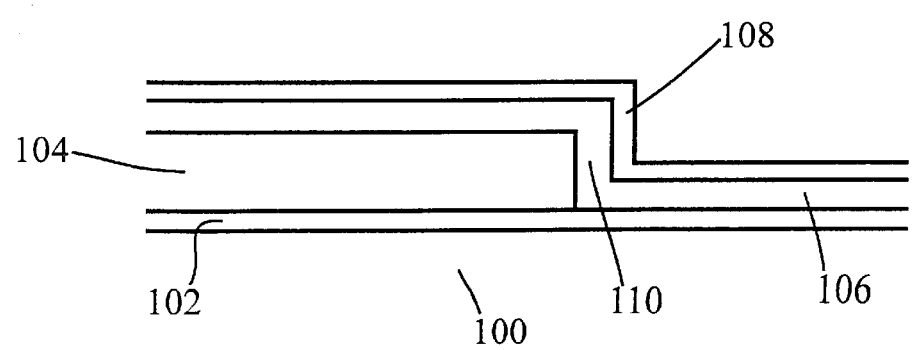
FIG. 2 is a vertical section through the waveguides of FIG. 1 showing the intersection in materials.
Figure 3:
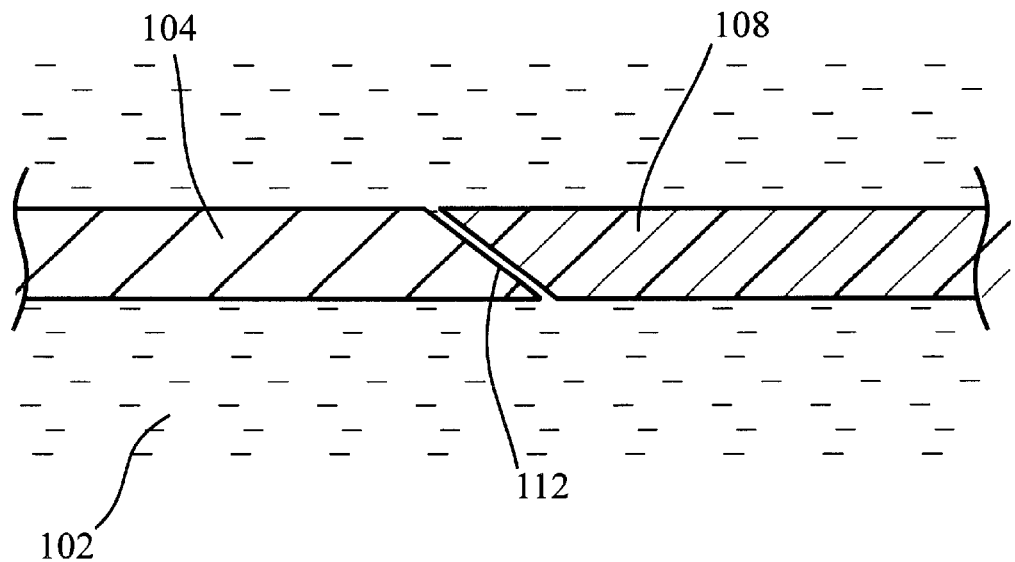
FIG. 3 is a top view corresponding to FIG. 2.

FIGS. 2 and 3 show a suitable interface between silicon and silicon nitride waveguides. Referring to FIG. 2, a silicon substrate 100 is coated with an oxide layer 102, on top of which is grown epitaxially a silicon waveguide 104. A further oxide layer 106 is grown over the silicon waveguide, and a nitride layer 108 is then provided over the entire surface. At the end of the silicon waveguide 104, usually formed as a ridge, there will be step 110, the nitride layer 108 descending over the step. Suitable control of the thickness of the oxide layer 106 will ensure that the nitride layer 108 is, after the step, level with a light transmissive part of the silicon waveguide 104. Thus, light will escape the end of the ridge waveguide 104 and enter the nitride layer 108.

FIG. 3 shows a further refinement of the arrangement of FIG. 2. It can be seen that the end 112 of the silicon waveguide 104 is angled so as to suppress back reflections. Likewise, the beginning of the nitride waveguide is angled, by virtue of its being formed over the silicon waveguide ridge.

A specific embodiment will now be worked through using silicon and silica as the transmissive media.

Typical values of the physical parameters are;

Silicon: $n_1 = 3.5 \quad \frac{dn_1}{dT} = 2 \times 10^{-4}$

Silica: $n_2 = 1.5 \quad \frac{dn_2}{dT} = 1.1 \times 10^{-5}$

Thus, to design a Mach Zehnder interferometer with an optical path difference of 15 µm, we have;

$$15 = n_1 l_1 + n_2 l_2 - n_1 l_3 - n_2 l_4$$
$$15 = 3.5(l_1 - l_3) + 1.5(l_2 - l_4)$$
$$0 = 2 \times 10^{-4}(l_1 - l_3) + 1.1 \times 10^{-5}(l_2 - l_4)$$
$$0 = 200(l_1 - l_3) - 11(l_4 - l_2)$$
$$\frac{200}{11} = \frac{l_4 - l_2}{l_1 - l_3}$$

So $$l_1 - l_3 = -0.63 \text{ µm}$$
$$l_2 - l_4 = 11.47 \text{ µm}$$

This shows that the interferometer can be designed with either $l_1$ or $l_4$ as zero.

Figure 4:
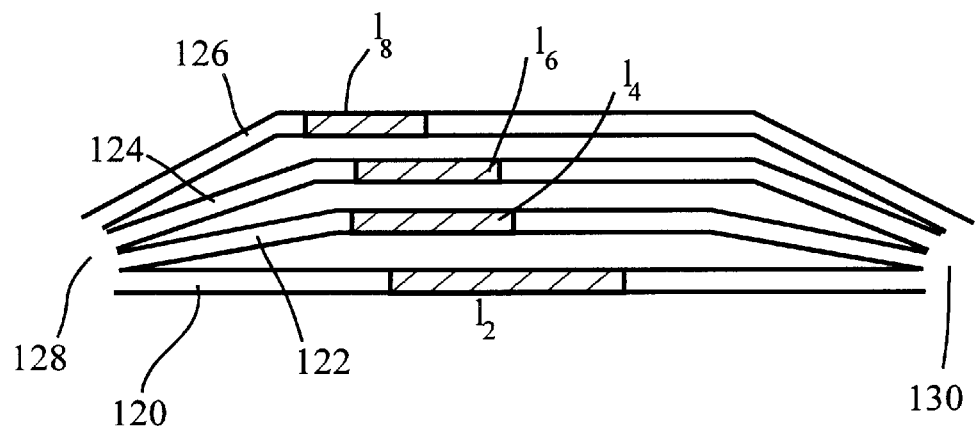
FIG. 4 shows an arrayed waveguide grating according to the present invention.

FIG. 4 shows an arrayed waveguide grating. Several waveguides 120, 122, 124, 126 depart from a coupler region 128, follow paths with different path lengths, and recombine at a second coupler region 130. This can be designed using an analogous procedure. It is simplest to begin with the first pair of waveguides, and infer the dimensions of the remaining waveguides by working from the dimensions of the adjacent guide. For a grating with a wavelength spacing of 2 nm, a suitable waveguide length difference will be 40 µm.

So:

$$40\mu = 3.5(l_1 - l_3) - 1.5\frac{200}{11}(l_1 - l_3)$$
$$l_1 - l_3 = -1.68 \text{ µ}$$
$$l_2 - l_4 = 30.6 \text{ µ}$$

It is then a straightforward procedure to calculate values for $l_5$, $l_6$ etc based on the chosen values of $l_1$ to $l_4$.

What is claimed is:

1. An integrated optical device comprising at least a first and a second associated optical pathway, at least the first associated optical pathway including at least two sub-sections of a first and a second different transmissive material, the different materials exhibiting a different temperature dependence of refractive index, the lengths of the pathways and of sub-sections being selected such that the device is substantially temperature insensitive, wherein the second associated optical pathway also includes a sub-section of a different transmissive material.

2. An integrated optical device according to claim 1, wherein one of the first and second materials is silicon.

3. An integrated optical device according to claim 1, wherein one of the first and second materials is silicon nitride.

4. An integrated optical device according to claim 1, wherein one of the first and second materials is $SiO_2$.

5. An integrated optical device according to claim 1, wherein each of the first and second associated optical pathways includes only two sub-sections.

6. An integrated optical device according to claim 1, including two sub-sections on two pathways.

7. An integrated optical device according to claim 1, wherein the ratio of the difference in length of sub-sections formed of the first material to the difference in length of the second material is equal to the inverse ratio of the respective refractive index gradients with temperature of the materials used.

8. An integrated optical device according to claim 1, wherein the integrated optical device is integrated on a silicon or silicon-on-insulator chip.

9. An integrated optical device according to claim 1, wherein the integrated optical device is an inteferometer.

10. An integrated optical device according to claim 1, wherein the integrated optical device is an arrayed waveguide grating.

11. An integrated optical device comprising at least a first and a second associated optical pathway, at least the first associated optical pathway including at least two sub-sections of a first and a second different transmissive material, the different materials exhibiting a different temperature dependence of refractive index, the lengths of the pathways and of sub-sections being selected such that the device is substantially temperature insensitive, wherein each of the first and second associated optical pathways includes only two sub-sections.

12. An integrated optical device comprising at least a first and a second associated optical pathway, at least the first associated optical pathway including at least two sub-sections of a first and a second different transmissive material, the different materials exhibiting a different temperature dependence of refractive index, the lengths of the pathways and of sub-sections being selected such that the device is substantially temperature insensitive, wherein two sub-sections are included on two of the at least first and second associated optical pathways.

* * * * *